Nov. 13, 1945.   C. M. HINES   2,389,052
ELECTRO-PNEUMATIC BRAKE SYSTEM
Filed July 1, 1944   2 Sheets-Sheet 1

Fig.1

INVENTOR.
Claude M Hines
BY
ATTORNEY

Nov. 13, 1945.    C. M. HINES    2,389,052
ELECTRO-PNEUMATIC BRAKE SYSTEM
Filed July 1, 1944    2 Sheets-Sheet 2

Fig. 2

INVENTOR.
Claude M. Hines
BY
*A. L. Vincill*
ATTORNEY

Patented Nov. 13, 1945

2,389,052

UNITED STATES PATENT OFFICE 2,389,052

ELECTROPNEUMATIC BRAKE SYSTEM

Claude M. Hines, Pittsburgh, Pa., assignor to The Westinghouse Air Brake Company, Wilmerding, Pa., a corporation of Pennsylvania Application July 1, 1944, Serial No. 543,080

7 Claims. (Cl. 303—20)

This invention relates to electropneumatic brake systems, and more particularly to a fluid pressure actuated brake equipment for a railway train embodying electrical means controlled at the leading vehicle or locomotive for expediting and rendering uniform the application and release of the brakes throughout the train.

Experience has indicated that both automatic air brake systems and electropneumatic brake systems of current design can economically be used only on trains that are definitely limited in length. Safe control of the slack action between cars necessitates rapid propagation of the application of the brakes uniformly throughout a long train, so that the braking forces on the individual cars can be increased at substantially the same time. It has been determined that the maximum propagation speed theoretically possible for airbrake systems has already been closely approached by development of existing equipments, and that further increase in the length of the trains equipped with standard electropneumatic brake apparatus would require recourse to bulky train cables of large cross section and provided with special insulation, in order to overcome the effects of voltage drop between the sources of operating current on the locomotives and the brake controlling magnets on the cars. If recent improvements in locomotive design in combination with roadbed betterments are to be exploited to the greatest advantage, it becomes expedient to extend the present limits on the length of trains by devising new means facilitating exact and rapid control of the airbrakes on railway vehicles, without unduly increasing the cost of manufacture and operation of the equipment.

It is an object of my invention to provide an improved electropneumatic brake equipment having electronic control means operative to govern energization of local circuits connected to magnet valves on cars in a train, in accordance with variations in voltage impressed on a grid control circuit common to all electronic control devices in the system.

Another object of the invention is to provide an improved electropneumatic brake system for railway service comprising fluid pressure responsive means for applying the brakes on units in a train, and electronic means constructed and arranged to control operation of the fluid pressure responsive means from the locomotive.

A further object of the invention is to provide electronic brake control means designed for utilization of commercially available elements such as electronic tubes, and constructed in a form suitable for installation in existing railway brake systems.

Other objects and advantages of the invention will be apparent in the following more detailed description thereof, taken in connection with the accompanying drawings, in which Fig. 1 is a diagrammatic view of an elementary form of electropneumatic brake equipment for locomotives and cars in a train, constructed and arranged in accordance with one form of the invention; and Fig. 2 is a similar view of an electropneumatic brake system embodying electronic control features constructed in accordance with another form of the invention.

*Apparatus shown in Figure 1*

The equipment illustrated in Fig. 1 includes brake apparatus adapted to be carried on a locomotive and two cars in a train, the elements of the brake system being shown in elementary, schematic form. The apparatus mounted on the locomotive includes a brake valve device 1, a main reservoir 2, a master controller device 3, a control pipe 4, a straight air pipe 5, an application and release magnet valve unit 6, and a brake cylinder 7, which is adapted to actuate the usual braking elements associated with the locomotive wheels, not shown. The locomotive equipment further includes a pair of electron discharge devices 8 and 9 of the vacuum type constructed and arranged as hereinafter explained for controlling circuits for energizing the application and release magnets from a local source of electrical energy, such as a battery 10. Associated with the master controller 3 is another battery 11 which is adapted to energize the grid circuits of the respective electron discharge devices.

The brake equipment on each of the cars connected to the locomotive includes the straight air pipe 5 and a supply pipe 12 connected to the main reservoir 2 on the locomotive, an auxiliary reservoir 13, a brake cylinder 14, an application and release magnet valve unit 15, a car battery 16, and electron discharge devices 17 and 18, which are preferably of the vacuum type.

The master controller device 3 carried on the locomotive comprises a hollow casing structure having mounted therein a pair of flexible diaphragms 19 and 20, the central portions of which are secured to an axially disposed follower member 21 extending through a central chamber 22. At the outer face of the diaphragm 19 is formed a pressure chamber 23, which communicates by way of a passage 24 with the straight air pipe 5 and, for the purpose of illustrating the invention, with the brake cylinder 7. Formed at the outer face of the diaphragm 20 is a pressure chamber 25, which communicates with the control pipe 4 through which fluid under pressure can be supplied to the chamber 25 for operating diaphragm 20 in opposition to the pressure of fluid in chamber 23 acting against the diaphragm 19, as hereinafter explained. A spring-pressed abutment 26 is mounted in the casing structure in operative alignment with the end of the follower member 21 adjacent the diaphragm 19 for resisting movement of the diaphragm and follower assemblage to the left, as viewed in Fig. 1. Mounted on the follower member 21 within chamber 22 is an insulated block 27 which is operatively aligned with one of a pair of normally engaged contact elements 28, initial movement of the block 27 to the left serving to separate the contact elements. The block 27 is also operatively aligned with another pair of normally engaged contact elements 29, which are positioned farther to the left, beyond the contact elements 28, so that continued movement of the block 27 subsequent to disengagement of the contact elements 28 will serve to disconnect the contact elements 29. As explained hereinafter, the contact elements 28 and 29 are connected for controlling the energization of suitable grid circuits for the tubes 8 and 9 on the locomotive, and the respective sets of tubes 17 and 18 on each of the cars in the train, in accordance with operation of the master controller device 3. The latter device is in turn operative in response to manipulation of the brake valve device 1, which is preferably of the self-lapping type operable to charge the control pipe 4 to any desired pressure, as determined by the position to which the usual handle is moved.

The application and release magnet valve unit 6 is interposed between the supply pipe 12 leading from the main reservoir 2 and the straight air pipe 5 leading to the brake cylinder 7, and comprises a casing structure having a valve chamber 29 containing a normally unseated release valve element 30 that is movable to its seated position upon energization of a magnet 31, and a valve chamber 32 containing an application valve element 33, which is normally urged toward a seated position and is operative to its unseated position upon energization of an application magnet 34. The release valve element 30 is arranged to control communication from the brake cylinder 7 and straight air pipe 5 to the atmosphere, while the application valve element 33 is adapted to control communication from the main reservoir supply pipe 12 to the straight air pipe and brake cylinder. The magnet valve units 15 carried on cars on the train are similar in construction to the unit 6 just described. It will be understood that the auxiliary reservoir 13 associated with the equipment on each car is normally maintained charged with fluid under pressure from the supply pipe 12 to provide a local volume of fluid under pressure.

The electronic tubes 8 and 9 on the locomotive, and tubes 17 and 18 on each of the cars on the train, are provided with control elements or grids connected to common control circuits extending through the train, and are arranged for simultaneous operation to control energization and de-energization of the corresponding magnet valve units of the brake system. The electron discharge device 9 has an anode 35, a cathode 36 and a grid or control element 37, and is arranged to control energization of the release magnet 31 through a circuit which includes the positive terminal of the battery 10, a conductor 38, the winding of the magnet 31, a conductor 39, the anode and cathode of the tube, and a conductor 40 leading to the negative terminal of the battery. The electronic tube 8 has an anode 41, a cathode 42, and a control element 43, and controls a plate circuit which includes the positive terminal of the battery 10, a conductor 44, the winding of the application magnet 34, a conductor 45, the anode and cathode of the tube 8, and return conductor 40 leading to the negative terminal of the battery. Filaments 46 and 47 of the respective tubes 8 and 9 may be heated through the medium of a common filament circuit, including a current limiting resistor 48, connected across the battery 10.

The electron discharge devices 17 and 18 on each of the cars in the train are likewise of the vacuum triode type, and are adapted to control energization of an application magnet 49 and a release magnet 50, respectively, carried by the unit 15. Each tube 18 comprises an anode 51, a cathode 52 and a control element 53, and controls a circuit which includes the positive terminal of the local car battery 16, a conductor 54, the winding of the release magnet 50, a conductor 55, the anode 51, cathode 52, and a conductor 56 leading to the negative terminal of battery. Similarly, each electronic tube 17 controls the magnet 49 through a circuit including the positive terminal of the battery 16, a conductor 57, the winding of the magnet, a conductor 58, an anode 59 of the tube, a cathode 60 of the tube, and the return conductor 56 to the negative terminal of the battery 16. The tube 17 has a control grid 61 connected in a train control circuit as hereinafter explained, and also has a heating filament 62 which, together with a similar filament 63 of the tube 18, is adapted to be energized from the battery 16 through a filament circuit in which is interposed a current limiting resistor 64.

The control grid circuits for the electron discharge devices 8 and 9 on the locomotive, and for the electron discharge devices 17 and 18 on each of the cars in the train, are established through the medium of three train wires 65, 66, and 67, the grid circuits being energized from the battery 11 carried on the locomotive, under control of the master controller device 3. The train wire 67 is connected to the positive terminal of the battery 11, and is also connected to the conductor 40 leading to the cathodes of the tubes 8 and 9 on the locomotive, and to the conductor 56 leading to the cathodes of the tubes 17 and 18 on each of the cars, by way of conductors 67, as shown in Fig. 1. A conductor 68 is provided for connecting the negative terminal of the battery 11 to one of the normally engaged contact elements 29 of the master controller device 3, the other contact element 29 being connected to the train wire 65, which is in turn connected through a current limiting resistor 69 to the control grid 43 of tube 8 on the locomotive and also through a current limiting resistor 70 on each of the cars to the associated control grid 61 of the tube 17 provided on each car. It will thus be seen that a negative biasing voltage is impressed on each of the grids 43 and 61 in the system, so long as the contact elements 29 in the master controller device 3 remain closed. The negative terminal of battery 11 is also connected through the medium of conductor 68 to one of the normally engaged contact elements 28 in the master controller device, the other contact element 28 being connected to the train wire 66. The train wire 66 is connected to the grid 37 of the tube 9 on the locomotive through the medium of a current limiting resistor 71, and also to the grid 53 of each electron discharge tube 18 on each car through the medium of a current limiting resistor 72. Consequently so long as the contact elements 28 are closed as shown, a negative biasing voltage will be impressed upon the respective grids of tubes 9 and 18 throughout the train. It will be understood that the negative biasing potential thus impressed on the grids of the respective tubes is predetermined by a proper proportioning of the various elements of the grid circuits so as to render the respective tubes nonconductive while the master controller device 3 remains inoperative.

In Fig. 1 the brake controlling apparatus is illustrated as conditioned for maintaining the brakes released throughout the train, it being assumed that the brake valve device 1 is disposed in release position for connecting the control pipe 4 to the atmosphere. The movable elements of the master controller device 3 are thus disposed in the inoperative position, with the normally closed pairs of contact elements 28 and 29 positioned for maintaining energized the grid circuits for the electron discharge devices included in the equipment, as already explained. The electron discharge devices thus remain nonconductive, and since no current is supplied to the application and release magnets of the magnet valve units 6 and 15, the respective valve elements thereof are positioned for venting the respective brake cylinders 7 and 14 to the atmosphere.

When it is desired to effect an application of the brakes, the brake valve device 1 is moved to an application position for causing supply of fluid under pressure from the main reservoir 2 to the control pipe 4 and to the chamber 25 in the master controller device 3, with the result that the diaphragm 20, follower element 21 and diaphragm 19 are forced to the left, as viewed in the drawing. Upon initial movement of the follower member to the left, the block 27 thereon is brought into engagement with the extension on one of the contact elements 28 to interrupt the circuit controlled by these contact elements. As previously pointed out, the contact elements 28 are arranged to control the train circuit for supplying the negative biasing potential to the grids of the electron discharge devices 9 and 18, which are rendered conductive upon removal of the negative charge from the control grids thereof. The release magnet 31 on the locomotive is thus energized through the circuit controlled by tube 9 as hereinbefore described, and simultaneously each of the release magnets 50 on cars throughout the train is energized by way of the local circuit controlled by the associated tube 18. The respective release valve elements are consequently operated to cut-off the atmospheric vent communications for the brake cylinders 7 and 14.

Upon continued movement of diaphragms 20 and 19 and the follower element 21 of the master controller device 3, the block 27 is brought into operative engagement with the extension of one of the contact elements 29 for interrupting the grid biasing circuit controlled thereby, with the result that the tube 8 on the locomotive is rendered conductive for effecting energization of the application magnet 34, while the tubes 17 on the cars are rendered conductive for effecting energization of the associated application magnets 49. Upon energization of the application magnets throughout the train, the magnet valve elements controlled thereby are unseated for effecting supply of fluid under pressure from the main reservoir pipe 12 to the respective brake cylinders to produce an application of the brakes in the usual manner.

Meanwhile, fluid under pressure supplied to the brake cylinder 7 by way of the pipe 5 on the locomotive also flows from that pipe to the diaphragm chamber 23 in the master controller device 3, and when the force thus created on the diaphragm 19 substantially equals that exerted in the opposite direction on the diaphragm 20 by control pipe pressure, the diaphragms and follower member 21 are caused to move to the right, until the block 27 is carried away from the contact elements 29 to permit reestablishment of the grid biasing circuit for each of the tubes 8 and 17 throughout the train. The vacuum tube 8 on the locomotive is thus rendered nonconductive as the negative biasing voltage is again impressed upon the control grid 43 thereof, so that the magnet 34 of the application magnet valve device is once more deenergized for cutting off further supply of fluid under pressure to the brake cylinder 7. At the same time, each of tubes 17 is rendered nonconductive upon restoration of the biasing potential on the associated control grid 61, with the result that the local application magnet 49 becomes deenergized to effect cutoff of the supply of fluid under pressure to the brake cylinder 14 on the car.

Since fluid under pressure is no longer supplied to the straight air pipe 5 and the diaphragm chamber 23 connected thereto, further movement of the diaphragms and follower member 21 of the master controller device is prevented at this time, the block 27 thus being held stationary while still positioned to maintain the contact elements 28 separated. It will thus be understood that the grid biasing circuit for the respective tubes 9 and 18 of the brake controlling system is still closed, so that those tubes remain conditioned to conduct current for energizing the respective release magnets 31 and 50, preventing release of any fluid under pressure from the brake cylinders. The electro-pneumatic brake equipment is therefore maintained in a condition for continuing the application of the brakes in accordance with the predetermined pressure of fluid established in the control pipe 4 by operation of the brake valve device.

If it is desired to increase the degree of application of the brakes, the brake valve device 1 may be again operated to effect further supply of fluid under pressure to the control pipe 4 for again increasing the pressure in the diaphragm chamber 23 of the master controller device, whereupon the diaphragms and block element 27 are again operated to interrupt the grid biasing circuit controlled by the contact elements 29 in the manner hereinbefore explained. Each of the tubes 8 and 17 is then rendered conductive long enough to cause energization of the associated application magnets to effect the desired increase in the brake cylinder pressure. When the pressure of fluid in control pipe 5 and diaphragm chamber 23 has thus been further increased to a value representing the desired brake cylinder pressure, the diaphragm 19 is forced to the right against the opposing control pipe pressure acting on diaphragm 20, until the block element 27 permits closure of the contact elements 29 to restore the grid biasing circuit for the tubes 8 and 17 controlling the various application magnets throughout the train.

When it is desired to effect the release of the brakes, the brake valve device 1 is operated to cut off the supply of fluid under pressure from the main reservoir to control pipe 4 while venting the latter pipe to the atmosphere, thus causing reduction in the pressure of fluid in diaphragm chamber 25 of the master controller device. Upon reduction in the pressure of fluid acting on the diaphragm 20, the straight air pipe pressure acting in chamber 23 of the master controller device against the diaphragm 19 is rendered effective to shift the diaphragms, follower member 21 and block element farther to the right until the block is carried out of operative alignment with the contact elements 28, which are thus permitted to close the biasing circuit for the tubes 9 and 18 throughout the train. Upon energization of this circuit, which has already been traced, a negative biasing potential is again impressed on the grid 37 of tube 9, and on the respective grids 53 of the tubes 18 on the cars, so that all of these tubes are again rendered nonconductive. The release magnets 31 and 50 are consequently deenergized for effecting release of fluid under pressure from associated brake cylinders 7 and 14.

It will thus be understood that by employing the master controller device 3 on the locomotive for controlling grid biasing circuits for the electronic devices controlling the brakes throughout the trains, the electropneumatic brake system can be equipped to enable an engineer to effect operation of all brake controlling devices throughout the train accurately and substantially instantaneously, regardless of the length of the train. The current flowing in the grid biasing circuits is very low in comparison to the current required for energizing the brake controlling magnets from the head end of a train; consequently there will be substantially no voltage drop in the train wires constituting these grid circuits, and practically no limit on the length of the train so far as the brake system is concerned. All elements of the electronic control equipment may be of a standard design readily obtainable without requirement of special construction. The air brake system with which the electronic control apparatus is associated may be provided with all the features of construction which have heretofore proved successful in the control of the brakes on heavy, high-speed trains, with the result that the advantages of such an air brake system will be augmented and given increased effectiveness due to the sensitive control afforded by the electronic means.

*Apparatus shown in Figure 2*

In Fig. 2 is illustrated substantially the same elementary form of fluid pressure brake system as that already described in connection with Fig. 1 in conjunction with an electronic means for controlling the brakes on each unit in the train embodying the invention in a different form. Elements of the apparatus shown in Fig. 2 which are similar in construction and function to those shown in Fig. 1 have been identified by like reference characters, and need not be again described in detail. As shown in Fig. 2, the electron discharge device or tube 9 on the locomotive, and the tube 18 on each of the cars in the train, are constructed and arranged to constitute the means for controlling both of the associated application and release magnets of the fluid pressure brake equipment, while the master controller device 3 on the locomotive is in this case adapted to effect energization of the single control grid circuit of the train at different potentials in effecting the desired control of the brakes.

According to the invention as disclosed in Fig. 2 of the drawings, the brake controlling equipment on the locomotive includes, in addition to the devices which will be recognized as having been described previously, a voltage divider having an adjustable minimum voltage tap 73 and a similar maximum voltage tap 74. The voltage divider is arranged in conjunction with a contact element of the master controller device 3 for controlling energization of the grid biasing circuit for the electron discharge device 9 on the locomotive, and the electron discharge device 18 on cars of the train, which devices in this case constitute the sole circuit controlling means for both the application and release magnets controlling the pressure of fluid in the respective brake cylinders. The plate circuit of the tube 9 on the locomotive, which controls operation of the magnet valve device 6, includes the positive terminal of battery 10, a conductor 75, magnet 34, a conductor 76, magnet 31, a conductor 77, anode 35, cathode 36 and conductor 78 connected to the negative terminal of the battery. The plate circuit for each of the tubes 18 on cars in the train includes the positive terminal of battery 16, a conductor 79, magnet 49, a conductor 80, magnet 50, a conductor 81, anode 51 of the tube 18, cathode 52, and a conductor 82 leading to the negative terminal of the battery.

In operation, while the brakes are released, the elements of the master controller device 3 are positioned as shown in Fig. 2, so that the respective pairs of contact elements 28 and 29 are disposed in their normally engaged positions. A negative biasing potential is consequently impressed on the control grid 37 of the tube 9 of the locomotive, and also on the control grids 53 of the several tubes 18 on cars of the train, through a common grid circuit which includes conductor 67 leading from the positive terminal of the grid supply battery 11, the respective cathodes of the tubes, the control grids, conductor 66, the contact elements 28, and a conductor 83 leading to the maximum voltage tap 74, the portion of the voltage divider resistance preselected according to the position of the tap, and the negative terminal of the battery 11. It will be understood that each of tubes 9 and 18 are of the vacuum type, and that with the respective control grids thereof thus subjected to a maximum negative potential, the tubes are maintained substantially nonconductive, so that neither of the associated application and release magnets of the brake controlling valve device are now energized. The brake cylinder on each unit of the train is thus connected to the atmosphere through the corresponding release valve portion of the brake controlling magnet valve device.

When it is desired to effect an application of the brakes, the brake valve device 1 is operated to effect an increase in the pressure of fluid in the control pipe 4 and diaphragm chamber 25 of the master controller device 3, with the result that the diaphragms 20 and 19 together with rod 21 and block 27 are moved to the left for causing disengagement of the contact elements 28, in the manner hereinbefore explained. With the contact elements 28 thus separated, the grid biasing circuit already traced is interrupted, and the grid biasing voltage impressed on the respective grid elements of the tubes is thus reduced to a value preselected according to the positioning of the minimum voltage tap 73 on the voltage divider by way of the grid circuit which includes the positive terminal of the battery 11, conductor 67, the cathode elements of the tubes, the grids thereof, the conductor 66, the still engaged pair of contact elements 29 in the master controller device 3, a conductor 84, the tap 73, and a portion of the voltage divider resistance between the tap and the negative terminal of the battery. It will be understood that the various elements of the electronic control apparatus forming part of the brake controlling system are so proportioned that upon the reduction in grid biasing potential effected as just explained, each of the tubes 9 and 18 is rendered effective to pass a limited amount of current which will be of sufficient value to energize the release magnet of the associated brake controlling valve device to effect closure of the associated release valve without energizing the adjacent application magnet to the degree necessary for operation of the application valve controlled thereby. Thus by way of explanation, the tube 9 on the locomotive is rendered responsive to the partial withdrawal of the negative biasing voltage of the grid 37 for passing limited current through its plate circuit which includes the positive terminal of the battery 10, conductor 75, magnet winding 34, conductor 76, magnet winding 31, conductor 77, plate 35, cathode 36 and conductor 78 leading to the negative terminal of the battery, which current, while too low to cause unseating of the application valve 33, energizes the release magnet winding 31 sufficiently to effect closure of the release valve element 30, cutting off the communication between the brake cylinder 7 and the atmosphere.

Continued movement of the diaphragms 20 and 19 and of rod 21 and block 27 to the left quickly effects opening of the contact elements 29, thus removing the remaining grid biasing voltage of the respective control grids of the tubes throughout the train, for rendering the tubes conductive of a current sufficient to energize the various application magnets along with the release magnets. On the locomotive, the magnet winding 34 is thereby energized sufficiently to unseat the application valve element 33, and fluid under pressure is then supplied from the supply pipe 12 to the brake cylinder 7 and straight air pipe 5. This operation is repeated on each unit throughout the train, effecting a uniform and instantaneous application of the brakes.

The increased pressure of fluid in straight air pipe 5 then becomes effective in chamber 23 of the master controller device 3 to force diaphragm 19 to the right, in opposition to the pressure of fluid acting in chamber 25 against the diaphragm 20, until the block 27 is moved away from the contact elements 29, which are then permitted to assume their normally engaged position. There is thus impressed on the control grid elements throughout the train the minimum grid biasing voltage necessary to render the respective tubes conductive of the limited current which, as already explained, is sufficient to maintain the release magnets energized while being insufficient to cause effective energization of the application magnets. As a result of the partial deenergization of the application magnets, the application valve elements controlled thereby are returned to their closed position for cutting off further supply of fluid under pressure to the brake cylinders. The brake controlling apparatus is thus conditioned for maintaining the brakes applied throughout the train in accordance with the predetermined pressure of fluid established in the control pipe 4 by the usual operation of the brake valve device.

To release the brakes, the engineer may operate the brake valve device 1 for venting fluid under pressure from the control pipe 4, whereupon the pressure of fluid remaining in diaphragm chamber 23 of the master controller device 3 is rendered effective to shift the connected pair of diaphragms to the right, as viewed in Fig. 2, until the block 27 is carried out of operative alignment with the contact elements 28. With the contact elements 28 thus permitted to assume their normally closed position, the grid biasing circuit controlled thereby is reestablished, with the result that the maximum grid biasing potential is restored on each of the control grids of tubes throughout the train, rendering the tubes nonconductive for deenergizing the associated release magnets in addition to the application magnets. The various release valves are therefore simultaneously operated to release fluid under pressure from the brake cylinders to effect the release of the brakes in the usual manner.

From the foregoing it will be apparent that with the electronic control apparatus disclosed in Fig. 2, the fluid pressure brakes throughout a long train may be controlled accurately, each operation of the brake valve device on the locomotive inducing an instantaneous response by the brake controlling equipment on each unit throughout the train. By the use of vacuum type electronic tubes operative to conduct current proportional to the degree of grid bias voltage, the number of train wires required can be reduced to two, while the electronic apparatus for each train unit may consist of a single vacuum tube with the necessary circuits, including a train length grid circuit adapted to carry a negligible current to produce the grid biasing voltages. Although only an elementary form of fluid pressure brake system has been disclosed in connection with my improved electronic brake controlling apparatus, it will be understood that the features of the invention may be incorporated in more elaborate electropneumatic brake systems, such as those with which existing railroad cars have been equipped.

Having now described my invention, what I claim as new and desire to secure by Letters Patent is:

1. An electronically controlled electropneumatic braking system comprising means for effecting application and release of the brakes including an application magnet and a release magnet, a control pipe chargeable with fluid under pressure preselected according to any desired degree of application of the brakes, a master controller device including fluid pressure actuated switch means responsive to relative changes in pressure of fluid in said control pipe and an opposing pressure measuring the degree of application of the brakes, an electron discharge device including a control member and an anode-cathode circuit for energizing said application magnet, another electron discharge device including a control member and anode-cathode circuit for energizing said release magnet biasing circuits connected to said control members, respectively, and normally conditioned by said master controller device to impress a negative potential on each of said control members for rendering each electron discharge device nonconductive in maintaining the brakes released, said master controller being operative upon an increase in control pipe pressure first to interrupt the biasing circuit for the electron discharge device controlling said release magnet and then to interrupt the biasing circuit for the control member of the electron discharge device for said application magnet.

2. In a brake system of the type having a brake cylinder operative to effect application of the brakes according to the pressure of fluid supplied thereto, the combination of application magnet valve means normally conditioned to cut off the supply of fluid under pressure to the brake cylinder and operative when energized to cause fluid under pressure to be supplied to the brake cylinder, release magnet valve means normally conditioned to effect the release of fluid under pressure from the brake cylinder and operative when energized to cut off the release of fluid under pressure from the brake cylinder, electron discharge means adapted to be conditioned to selectively cause simultaneous deenergization of said application and release magnet valve means, energization of only said release magnet valve means, or simultaneous energization of said application and release valve means whereby to control the supply and the release of fluid under pressure to and from the brake cylinder and the maintenance of a pressure therein, and fluid pressure operated switch means of the self-lapping type operative according to the relation of a control fluid pressure and a pressure corresponding to that established in the brake cylinder for controlling said electron discharge means so as to cause said application and release magnet valve means to operate to control the supply and release of fluid under pressure to and from the brake cylinder so as to effect the establishment of a pressure in the brake cylinder corresponding to the control fluid pressure supplied to the fluid pressure operated switch means.

3. In a brake apparatus of the type having a brake cylinder operative to effect application of the brakes according to the pressure of fluid supplied thereto, the combination of an application magnet valve device effective when deenergized to cut off the supply of fluid under pressure to the brake cylinder and operative when energized to cause fluid under pressure to be supplied to the brake cylinder, a release magnet valve device effective when deenergized to cause fluid under pressure to be released from the brake cylinder and operative when energized to cause cut-off of the release of fluid under pressure from the brake cylinder, a first electron discharge device having a control element and an anode-cathode circuit for controlling energization and deenergization of the application magnet valve device, a second electron discharge device having a control element and an anode-cathode circuit for controlling energization and deenergization of the said release magnet valve device, and means for controlling the degree of biasing voltage impressed on the control elements of said discharge devices in a manner to cause said discharge devices to selectively effect the simultaneous deenergization of both said magnet valve devices, the simultaneous energization of both said magnet valve devices, or the simultaneous energization of the release magnet valve device and deenergization of the application magnet valve device.

4. In a brake apparatus of the type having a brake cylinder operative to effect application of the brakes according to the pressure of fluid supplied thereto, the combination of an application magnet valve device effective when deenergized to cut off the supply of fluid under pressure to the brake cylinder and operative when energized to cause fluid under pressure to be supplied to the brake cylinder, a release magnet valve device effective when deenergized to cause fluid under pressure to be released from the brake cylinder and operative when energized to cause cut-off of the release of fluid under pressure from the brake cylinder, a first electron discharge device having a control element and an anode-cathode circuit for controlling energization and deenergization of the application magnet valve device, a second electron discharge device having a control element and an anode-cathode circuit for controlling energization and deenergization of the said release magnet valve device, and a fluid pressure operated switch device of the self-lapping type operatively controlled according to the relation of a control fluid pressure and an opposing fluid pressure corresponding to the pressure established in the brake cylinder operative in response to an increase of the control fluid pressure to cause a biasing voltage on the control element to said discharge devices to be varied in a manner to cause sequential energization of the release magnet valve device and of the application magnet valve device, said fluid pressure operated switch device being effective in response to the build-up of a pressure in the brake cylinder coresponding to that of an established control fluid pressure for so controlling the biasing voltage imposed on the said first electron discharge device as to cause deenergization of the application magnet valve device only.

5. In a brake system of the type having a brake cylinder operative to effect application of the brakes according to the pressure of fluid supplied thereto, the combination of a fluid pressure operated switch device of the self-lapping type operatively controlled according to the relation of a control fluid pressure and an opposing fluid pressure corresponding to that established in the brake cylinder, said switch device comprising a first switch and a second switch adapted to be sequentially operated in the order named in response to an increase of the control fluid pressure and sequentially operated in the reverse order in response to a reduction of the control fluid pressure, an application magnet operative when energized to cause fluid under pressure to be supplied to the brake cylinder and when deenergized to cause cut-off of the supply of fluid under pressure to the brake cylinder, a release magnet effective when deenergized to cause fluid under pressure to be released from the brake cylinder and operative when energized to cut off the release of fluid under pressure from the brake cylinder, a first electron discharge device including a control member and an anode-cathode circuit for controlling energization of the said release magnet, a second electron discharge device including a control member and an anode-cathode circuit for controlling energization of said application magnet, a circuit including said first switch of said fluid pressure operated switch device normally effective to impress a biasing voltage on the control member of said first electron discharge device to render it nonconductive, said first switch being operative upon an increase of the control fluid pressure to effect a variation of the biasing voltage impressed on the control member whereby to render the said first electron discharge device conductive thereby to cause energization of said release magnet, a second circuit including the second switch of said fluid pressure operated switch device normally effective to impress a biasing voltage on the said second electron discharge device rendering it nonconductive, said second switch being operative in response to an increase of the control fluid pressure supplied to the fluid pressure operated switch device for effecting a variation of the biasing voltage on the control member of said second electron discharge device thereby to cause energization of said application magnet, and being operative in response to the build-up of the opposing pressure corresponding to that established in the brake cylinder for restoring a biasing voltage on the control member of the said second electron discharge device to cause deenergization of the said application magnet, the pressure established in the brake cylinder being thereby maintained automatically in accordance with the pressure of the control fluid pressure.

6. In a brake system of the type having a brake cylinder operative according to the pressure of the fluid supplied thereto to effect a corresponding degree of application of the brakes, the combination of an application magnet valve device effective when deenergized to cut off the supply of fluid under pressure to the brake cylinder and operative when energized by a current exceeding a first certain value to cause fluid under pressure to be supplied to the brake cylinder, a release magnet valve device effective when deenergized to cause the release of fluid under pressure from the brake cylinder and operative when energized by a current exceeding a second certain value lower than the said first certain value for causing cut-off of the release of fluid under pressure from the brake cylinder, a single electron discharge device having a control element and an anode-cathode circuit for controlling energization of both said application and release magnet valve devices, and means for selectively applying different degrees of a biasing voltage on the control element of said electron discharge device whereby to correspondingly control the degree of current in the anode-cathode circuit to cause simultaneous deenergization of both said magnet valve devices, simultaneous energization of both of said magnet valve devices by a current exceeding said certain value, or simultaneous energization of both of said magnet valve devices by a current exceeding said second certain value but less than said first certain value.

7. In a brake system of the type having a brake cylinder operative according to the pressure of the fluid supplied thereto to effect a corresponding degree of application of the brakes, the combination of an application magnet valve device effective when deenergized to cut off the supply of fluid under pressure to the brake cylinder and operative when energized by a current exceeding a first certain value to cause fluid under pressure to be supplied to the brake cylinder, a release magnet valve device effective when deenergized to cause the release of fluid under pressure from the brake cylinder and operative when energized by a current exceeding a second certain value lower than the said first certain value for causing cut-off of the release of fluid under pressure from the brake cylinder, a circuit including a source of voltage for supplying energizing current to said application and release magnet valve devices, a single electron discharge device having a control element and an anode-cathode path interposed in said circuit, and means for selectively imposing different biasing voltages on the control element of said electron discharge device whereby to interrupt said circuit and effect simultaneous deenergization of both the application and release magnet valve devices, or to control the current in the said circuit in a manner to cause simultaneous energization of both of the magnet valve devices by a current exceeding said certain degree, or simultaneous energization of both magnet valve devices by a current exceeding said second degree but less than said first degree.

CLAUDE M. HINES.